US009054375B2

(12) United States Patent
Choi et al.

(10) Patent No.: US 9,054,375 B2
(45) Date of Patent: Jun. 9, 2015

(54) RECHARGEABLE LITHIUM BATTERY

(75) Inventors: Nam-Soon Choi, Yongin-si (KR);
Sae-Weon Roh, Yongin-si (KR);
Man-Seok Han, Yongin-si (KR);
Sung-Soo Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 470 days.

(21) Appl. No.: 12/840,048

(22) Filed: Jul. 20, 2010

(65) Prior Publication Data

US 2011/0111289 A1 May 12, 2011

(30) Foreign Application Priority Data

Nov. 10, 2009 (KR) .................. 10-2009-0108274

(51) Int. Cl.
*H01M 4/36* (2006.01)
*H01M 4/52* (2010.01)
*H01M 4/131* (2010.01)
*H01M 4/1391* (2010.01)
*H01M 4/505* (2010.01)
*H01M 10/052* (2010.01)
*H01M 10/0525* (2010.01)
*H01M 10/0567* (2010.01)
*H01M 4/02* (2006.01)

(52) U.S. Cl.
CPC .......... *H01M 4/366* (2013.01); *H01M 2004/028* (2013.01); *H01M 4/52* (2013.01); *H01M 4/36* (2013.01); *H01M 4/131* (2013.01); *H01M 4/1391* (2013.01); *H01M 4/505* (2013.01); *H01M 10/052* (2013.01); *H01M 10/0525* (2013.01); *H01M 10/0567* (2013.01); *Y02E 60/122* (2013.01)

(58) Field of Classification Search
CPC ....... H01M 4/366; H01M 4/36; H01M 4/505; H01M 4/52; H01M 4/131; H01M 4/1391; H01M 10/052; H01M 10/0525; H01M 10/0567; H01M 2004/028; Y02E 60/122
USPC .............. 429/224, 231.1, 307, 233, 199, 200; 427/58, 123
See application file for complete search history.

(56) References Cited

U.S. PATENT DOCUMENTS

| 6,200,701 | B1 | 3/2001 | Gan et al. | |
|---|---|---|---|---|
| 7,494,746 | B2 | 2/2009 | Tarnopolsky | |
| 7,655,361 | B2 | 2/2010 | Kim et al. | |
| 7,736,807 | B2 | 6/2010 | Hasegawa et al. | |
| 2002/0009644 | A1* | 1/2002 | Yoshimura et al. | 429/231.1 |
| 2006/0228626 | A1 | 10/2006 | Kawashima et al. | |
| 2008/0118843 | A1 | 5/2008 | Tarnopolsky | |
| 2009/0017386 | A1 | 1/2009 | Xu et al. | |
| 2010/0015514 | A1 | 1/2010 | Miyagi et al. | |
| 2010/0266905 | A1 | 10/2010 | Jeon et al. | |

FOREIGN PATENT DOCUMENTS

| CN | 1862871 | A | 11/2006 |
|---|---|---|---|
| CN | 101404208 | A | 4/2009 |
| CN | 101404209 | A | 4/2009 |
| EP | 1 598 895 | A1 | 11/2005 |
| EP | 1 926 172 | A1 | 5/2008 |
| JP | 10-189043 | | 7/1998 |
| JP | 11-354104 | | 12/1999 |
| JP | 2004-014351 | | 1/2004 |
| JP | 2004-259682 | | 9/2004 |
| JP | 2006-244776 | | 9/2006 |
| JP | 2007-123097 | | 5/2007 |
| JP | 2007-213828 | | 8/2007 |
| JP | 2007-214120 | * | 8/2007 |
| JP | 2008-103330 | | 5/2008 |
| JP | 2008-130544 | | 6/2008 |
| JP | 2009-48981 | | 3/2009 |
| JP | 2009-110886 | | 5/2009 |
| JP | 2010-533359 | | 10/2010 |
| JP | 2010-539670 | | 12/2010 |
| JP | 2011-049152 | | 3/2011 |
| KR | 1020050068669 | A | 7/2005 |
| KR | 1020060041828 | A | 5/2006 |
| KR | 10-0804696 | B1 | 2/2008 |
| KR | 1020080061692 | A | 7/2008 |
| KR | 10-2009-0076313 | | 7/2009 |

OTHER PUBLICATIONS

Extended European Search Report dated Nov. 17, 2010, for corresponding European Patent application 10174945.5.
KIPO Notice of Allowance dated Apr. 30, 2012 for priority KR application No. 10-2009-0108274 (5 pages).
KIPO Office Action for corresponding Korean Priority Patent Application No. 10-2009-0108274, dated Jun. 30, 2011, 4 pages.
European Office action dated Nov. 2, 2011, for corresponding European Patent application 10174945.5, noting references previously submitted in an IDS dated Mar. 2, 2011, 6 pages.
Extended European Search Report dated Feb. 16, 2011 in corresponding European application No. 10174945.5, 8 pps.
English machine translation of Japanese Publication No. JP 2004-259682, 7 pps.
Aurbach, D. et al., *Common Electroanalytical Behavior of Li Intercalation Processes into Graphite and Transition Metal Oxides*, Journal of the Electrochemical Society., vol. 145, No. 9, Sep. 1998, pp. 3024-3034, XP007917014.
JP Office Action dated Sep. 4, 2012 for JP Patent Publication No. 2010-168790, 3 pages.
English Machine Translation of JP Patent Publication No. 2007-123097 dated May 17, 2007, 32 pages.
English Machine Translation of JP Patent Publication No. 2011-049152 dated Mar. 10, 2011, 46 pages.

(Continued)

*Primary Examiner* — Laura Weiner
(74) *Attorney, Agent, or Firm* — Christie, Parker & Hale, LLP

(57) ABSTRACT

A rechargeable lithium battery includes a positive electrode including a current collector, a positive active material layer on the current collector and including a lithium manganese-based positive active material, and a protective layer on the positive active material layer and including a phosphite-based compound; a negative electrode; and an electrolyte coupled with the positive electrode and the negative electrode and including a lithium salt, a non-aqueous solvent, and an additive.

5 Claims, 11 Drawing Sheets

(56) References Cited

OTHER PUBLICATIONS

English Machine Translation of JP Patent Publication No. 2004-014351 dated Jan. 15, 2004, 18 pages.
English Machine Translation of JP Patent Publication No. 2009-110886 dated May 21, 2009, 21 pages.
English Machine Translation of JP Patent Publication No. 11-354104 dated Dec. 24, 1999, 22 pages.
English Machine Translation of JP Patent Publication No. 2006-244776 dated Sep. 14, 2006, 46 pages.
English Machine Translation of JP Patent Publication No. 10-189043 dated Jul. 21, 1998, 14 pages.
English Machine Translation of JP Patent Publication No. 2007-213828 dated Aug. 23, 2007, 17 pages.
English Machine Translation of JP Patent Publication No. 2004-259682 dated Sep. 16, 2004, 8 pages.
SIPO Office action dated Sep. 10, 2013, with English translation, for corresponding Chinese Patent application 201010281743.2, (7 pages).
SIPO Office action dated Mar. 24, 2014, with English translation, corresponding to Chinese Patent application 201010281743.2, (11 pages).
Chinese Office Action dated Jan. 5, 2013 issued in Chinese Application No. 201010281743.2, 6 pages and English Translation, 6 pages.
EPO Office action dated Oct. 22, 2014, for corresponding European Patent application 10174945.5, (7 pages).

* cited by examiner

RECHARGEABLE LITHIUM BATTERY

CROSS-REFERENCE TO RELATED APPLICATION

This application claims priority to and the benefit of Korean Patent Application No. 10-2009-0108274 filed in the Korean Intellectual Property Office on Nov. 10, 2009, the entire content of which is incorporated herein by reference.

BACKGROUND

1. Field

The following description relates to a rechargeable lithium battery.

2. Description of the Related Art

Rechargeable lithium batteries have recently drawn attention as a power source for small portable electronic devices. The batteries use an organic electrolyte and thereby have twice the discharge voltage of a conventional battery using an alkali aqueous solution, and accordingly have high energy density.

Various carbon-based materials such as artificial graphite, natural graphite and hard carbon have been used as a negative active material of a rechargeable lithium battery. All of these materials can intercalate and deintercalate lithium ions.

Lithium-transition element composite oxides that are capable of intercalating lithium, such as $LiCoO_2$, $LiMn_2O_4$, $LiNi_{1-x}Co_xO_2$ ($0<x<1$) and the like, have been researched for use as a positive active material of a rechargeable lithium battery.

Among the positive active materials, a spineltype manganese-based positive active material is easily synthesized at a relatively low cost, has better thermal stability compared to other active materials during overcharge and contains fewer environmental contaminants. However, a disadvantage of the spineltype Mn-based positive active material is its comparatively low capacity. In addition, $Mn^{3+}$ is eluted from the surface of the Mn-based positive active material during the charge and discharge process, which causes a disproportionation reaction ($2Mn^{3+} \rightarrow Mn^{4+}+Mn^{2+}$) on the surface of the Mn-based positive active material. This results in defects in the positive active material. The disproportionation reaction is more actively carried out during contact with an electrolyte, particularly at high temperatures. Due to the disproportionation reaction, eluted Mn ions break the positive active material, degrade the structural stability, and decrease the capacity. Specifically, the cycle life of the battery is deteriorated at high temperatures.

Several attempts have been made to control the manganese-eluting characteristics of the positive active material in order to improve the high temperature storage and the high temperature cycle life characteristics. One method is to partially substitute the manganese with other transition metals such as nickel, cobalt or the like. Alternatively, it has been suggested that since HF, produced by the hydrolysis of $LiPF_6$, accelerates the elution of manganese, a material for neutralizing HF should be added to the electrolyte. A similar method is to coat the surface of the positive active material with lithium cobalt oxide. However, satisfactory improvements in the characteristics of a manganese-based active material have proven difficult to achieve using these methods.

SUMMARY

An aspect of an embodiment of the present invention is directed toward a rechargeable lithium battery capable of having relatively high storage safety, cycle life characteristics, and thermal stability.

According to an embodiment of the present invention, a rechargeable lithium battery includes a positive electrode including a current collector, a positive active material layer on the current collector and including a lithium manganese-based positive active material, and a protective layer on the positive active material layer and including a phosphite-based compound; a negative electrode; and an electrolyte coupled with the positive electrode and the negative electrode and including a lithium salt, a non-aqueous solvent and an additive.

The protective layer may include a decomposition product of a phosphite-based compound having a Highest Occupied Molecular Orbital ("HOMO") value of −10 eV or more and a Lowest Unoccupied Molecular Orbital ("LUMO") value of 1 eV to 1.3 eV.

The protective layer may include a decomposition product of a compound represented by the following Chemical Formula 1.

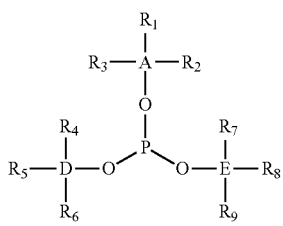

Chemical Formula 1

In the above Chemical Formula 1,

A, D and E are identical or different, and are selected from the group consisting of Si, C, Ge and Sn; and $R_1$ to $R_9$ are identical or different, and are selected from the group consisting of hydrogen, a substituted alkyl and an unsubstituted alkyl.

Particularly, the protective layer includes a product of one or more components of the electrolyte including the lithium salt, the non-aqueous solvent, the additive and a compound represented by Chemical Formula 1. The compound represented by Chemical Formula 1 is present at about 0.1 to 10 weight percent ("wt %") based on the total weight of the lithium salt and the non-aqueous solvent in the electrolyte.

The phosphite-based layer includes a compound having a carbonyl group and a lithium carbonate group. The compound may be represented by the following Chemical Formula 2.

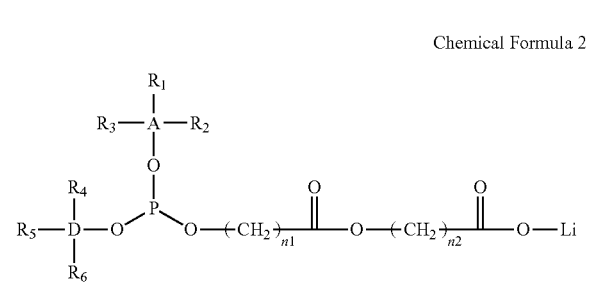

Chemical Formula 2

In the above Chemical Formula 2,

A and D are identical or different, and are selected from the group consisting of Si, C, Ge and Sn;

$R_1$ to $R_6$ are identical or different, and are selected from the group consisting of hydrogen, a substituted alkyl and an unsubstituted alkyl;

n1 is an integer from 1 to 5; and n2 is an integer from 1 to 5.

In an embodiment, the weight fraction of the protective layer in the rechargeable lithium batter may be about 3 to 35 parts by weight based on 100 parts by weight of the positive active material layer. The additive may have a HOMO value of −11 eV or less and a LUMO value of 1.2 eV or less. The additive may include an ethylene carbonate-based compound represented by the following Chemical Formula 3, an isoxazole compound represented by the following Chemical Formula 4 or a combination thereof.

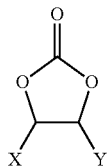

Chemical Formula 3

In the above Chemical Formula 3, X and Y are identical or different, and are selected from the group consisting of hydrogen, halogens, cyano (CN), nitro ($NO_2$) and a substituted alkyl, provided that at least one of X or Y is a halogen or a substituted alkyl.

Chemical Formula 4

The negative electrode has a solid electrolyte interface ("SEI") layer obtained by electrochemically reducing the additive on a surface of the negative electrode.

The additive is present in about 0.1 to 5 parts by weight based on a total 100 parts by weight of the lithium salt and the non-aqueous solvent.

The lithium manganese-based positive active material may be a compound represented by the following Chemical Formula 5, the following Chemical Formula 6, the following Chemical Formula 7, the following Chemical Formula 8 or a combination thereof.

$$Li_aMn_{1-b}M_bO_{2-c}G_c \quad \text{Chemical Formula 5}$$

$$Li_aMn_{2-b}M_bO_{4-c}G_c \quad \text{Chemical Formula 6}$$

In the above Chemical Formulae 5 and 6, $0.90 \leq a \leq 1.1$, $0 \leq b \leq 0.5$ and $0 \leq c \leq 0.05$;

M is selected from the group consisting of Al, Ni, Co, Mn, Cr, Fe, Mg, Sr, rare earth elements and combinations thereof; and G is selected from the group consisting of O, F, S, P and combinations thereof.

$$Li_xMO_{2-z}L_z \quad \text{Chemical Formula 7}$$

In the above Chemical Formula 7, M is $M'_{1-k}A_k$, where A is a dopant such as B, Ca, Zr, S, F, P, Bi, Al, Mg, Zn, Sr, Cu, Fe, Ga, In, Cr, Ge or Sn, $0 \leq k < 0.05$, and M' is $Ni_{1-d-e}Mn_dCo_e$, where $0.65 \leq d+e \leq 0.85$, $0.1 \leq e \leq 0.4$;

L is selected from a group consisting of F, S, P and combinations thereof;

$0.95 \leq x \leq 1.05$; and $0 \leq z \leq 2$.

$$Li_fMn_{1-g}M_gPO_4 \quad \text{Chemical Formula 8}$$

In the above Chemical Formula 8, $0.90 \leq f \leq 1.8$, $0 \leq g \leq 0.5$, and M is selected from the group consisting of Al, Ni, Co, Mn, Cr, Fe, Mg, Sr, rare earth elements and combinations thereof.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
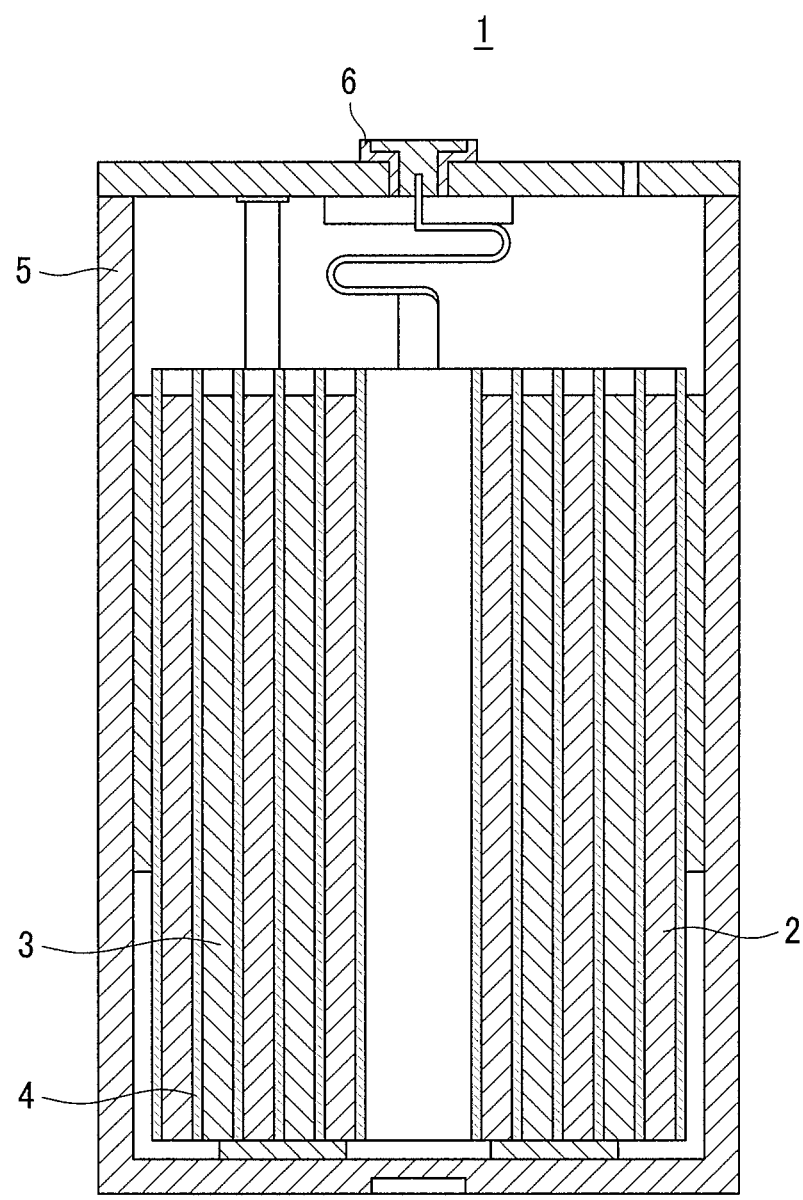
FIG. 1 is a schematic view showing a rechargeable lithium battery according to one embodiment.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

A rechargeable lithium battery according to one embodiment includes a positive electrode including a lithium manganese-based positive active material, a negative electrode, and an electrolyte.

The electrolyte (electrolyte solution) includes a lithium salt, a non-aqueous solvent and an additive. The additive is a compound capable of providing a solid electrolyte interface ("SEI") layer on the negative electrode surface by being electrically reduced during the early charge and discharge, also known as the formation charge, of the rechargeable lithium battery. The additive may include a compound having a Highest Occupied Molecular Orbital ("HOMO") value of −11 eV or less and a Lowest Unoccupied Molecular Orbital ("LUMO") value of 1.2 eV or less. The additive may have a HOMO value of −12 eV≤HOMO≤−11 eV and a LUMO value of 0.9 eV≤LUMO≤1.2 eV. In addition, the additive may include a compound having an oxidation decomposition potential between 3V and 4V compared to Li/Li⁺.

A representative example of the additive may include an ethylene carbonate compound represented by the following Chemical Formula 3, an isoxazole compound represented by the following Chemical Formula 4, or a combination thereof.

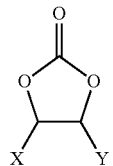

Chemical Formula 3

In the above Chemical Formula 3, X and Y may be the same or different. X and Y may be hydrogen, halogens, cyano (CN), nitro ($NO_2$), or a substituted alkyl, provided that at least one of X or Y is a halogen or a substituted alkyl. The substituted alkyl may be a substituted alkyl containing one to five carbons. In one embodiment, the substituted alkyl may be an alkyl in which at least one hydrogen is substituted with a halogen. In another embodiment, the substituted alkyl may be an alkyl in which at least one hydrogen is substituted with a fluorine.

Examples of the compounds represented by the above Chemical Formula 3 include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or a combination thereof.

Chemical Formula 4

The concentration of the additive may be 0.1 to 5 parts by weight, or 1 to 3 parts by weight based on a total 100 parts by weight of the lithium salt and the non-aqueous solvent. When the concentration of the additive is within the stated range, it is possible to provide a negative electrode protective layer, also called a SEI layer, having an appropriate thickness on the negative electrode surface. The SEI layer acts to protect the negative electrode to prevent a significant increase in the irreversible capacity $Q_{irr}$.

According to one embodiment, an electrolyte including an additive, a phosphite-based compound, a lithium salt and a non-aqueous organic solvent may be prepared before assembling a rechargeable lithium battery. In this case, the concentration of the additive may be 0.1 to 8 parts by weight or 1 to 6 parts by weight based on a total 100 parts by weight of the lithium salt and the non-aqueous solvent. The rechargeable lithium battery is fabricated using the electrolyte and initialized with a formation charge and discharge. The additive is reduced during the formation charge and discharge to form a protective layer, also called an SEI layer, on the negative electrode surface. Thereby, the remaining additive amount in the electrolyte may range from 0.1 to 5 parts by weight or 1 to 3 parts by weight.

The lithium salt and the non-aqueous solvent included in the electrolyte according to one embodiment may be a lithium salt and a non-aqueous solvent that are suitable for use in an electrolyte of a rechargeable lithium battery. They will be described later in more detail.

In one embodiment, a positive electrode includes a current collector, a positive active material layer on a surface of the current collector and including a lithium manganese-based positive active material, and a protective layer on a surface of the positive active material layer and including a phosphite-based compound.

The protective layer is on the surface of the positive active material layer to prevent the capacity deterioration of the lithium manganese-based positive active material caused by the elution of an Mn ion. The capacity deterioration of the lithium manganese-based positive active material is caused by oxidation of a manganese compound in the positive active material from an $Mn^{4+}$ ion to an $Mn^{3+}$ during a charge and discharge process; elution of the $Mn^{3+}$ ion from the positive active material; production of an $Mn^{2+}$ ion and an $Mn^{4+}$ ion from a disproportion reaction of the $Mn^{3+}$ ion; dissolution of the $Mn^{2+}$ ion into the electrolyte; and transport of the $Mn^{2+}$ ion to the negative electrode. This ultimately decreases the positive electrode capacity. It also causes the self discharge of the negative active material, which decreases the negative electrode capacity.

The weight fraction of the protective layer may be 3 to 35 parts by weight or 5 to 15 parts by weight based on a total 100 parts by weight of the positive active material. When the weight fraction of the protective layer is within the stated range, it is possible to effectively suppress the capacity deterioration of the lithium manganese-based positive active material due to the elution of the Mn ion.

The protective layer may include a decomposition product of a phosphite-based compound having a HOMO value of −10 eV or more and a LUMO value of 1 to 1.3 eV. The phosphite-based compound may have a HOMO value of −10 eV or more, or −7 eV or less.

In addition, the phosphite-based compound may have an oxidation decomposition potential of 4.0 V or less compared to Li/Li⁺. When the phosphite-based compound has a HOMO value, a LUMO value and an oxidation decomposition potential within the stated ranges, it is possible to form an appropriate protective layer on the surface of the positive electrode.

In one embodiment, a phosphite-based compound is represented by the following Chemical Formula 1. The phosphite-based compound may be included in a rechargeable lithium battery by adding it to the electrolyte.

In other words, a rechargeable lithium battery according to one embodiment is fabricated by providing an improved electrolyte in which a phosphite-based compound and an additive are added to a suitable electrolyte including a lithium salt and a non-aqueous organic solvent; assembling the rechargeable lithium battery; and performing the formation charge and discharge process to provide a phosphite-based protective layer on the positive electrode and to provide an SEI layer induced from the additive on the negative electrode. Thereby, some of the additive remains in the electrolyte.

If an electrolyte includes only the phosphite-based compound represented by the following Chemical Formula 1 but does not include the additive capable of forming the SEI layer on the negative electrode, a serious reduction decomposition reaction may be caused on the negative electrode surface. This increases the irreversible capacity $Q_{irr}$ of the negative electrode. Additionally, the phosphite-based compound represented by the following Chemical Formula 1 may fail to provide a protective layer on the positive electrode. An undesirable reaction may be caused on the negative electrode, resulting in a negative electrode layer having a deteriorated thermal stability. However, since a rechargeable lithium battery according to one embodiment includes an electrolyte including a phosphite-based compound together with an additive for forming an SEI layer on the negative electrode, it is possible to provide a negative electrode having a relatively high thermal stability.

A borate-based compound having a similar structure to the following Chemical Formula 1, except substituting boron for phosphorous, may be added to the electrolyte instead of the phosphite-based compound represented by the following Chemical Formula 1. However, the effect of suppressing the thermal stability deterioration using the borate-based compound is inferior to that using the phosphite-based compound. In particular, it is inferior for a rechargeable lithium battery including a lithium manganese-based compound positive active material.

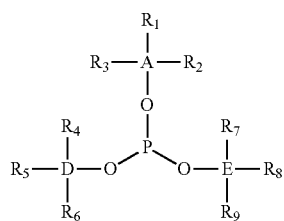

Chemical Formula 1

In the above Chemical Formula 1,

A, D and E may be the same or different, and may be Si, C, Ge or Sn. $R_1$ to $R_9$ may be the same or different, and may be hydrogen or a substituted or unsubstituted alkyl. The alkyl may be a C1 to C10 alkyl. The substituted alkyl may be an alkyl in which at least one hydrogen is substituted with a halogen, or an alkyl in which at least one hydrogen is substituted with a fluorine.

In one embodiment, a phosphite-based compound represented by Chemical Formula 1 is added to an electrolyte to provide a rechargeable lithium battery. The phosphite-based compound is decomposed during a formation charge and discharge of the rechargeable lithium battery to form a protective layer on a surface of a positive electrode. The phosphite-based compound may not remain in the electrolyte. The thickness of the protective layer is not a critical factor for showing the effects of the embodiment, and the thickness varies depending on the formation charge and discharge conditions. This phenomenon is easily understood by one skilled in the art.

The concentration of the phosphite-based compound represented by Chemical Formula 1 may be 0.1 to 10 wt % based on the total weight of the lithium salt and the non-aqueous solvent. When the concentration of the phosphite-based compound is within the stated range, the protective layer for suppressing the elution of Mn ions from the positive active material is suitably formed on the positive active material layer. The components of the phosphite-based compound may not remain in the electrolyte after the formation charge and discharge, but are present in the protective layer on the positive active material layer.

The decomposition product of the phosphite-based compound represented by Chemical Formula 1 may include a compound including a carbonyl group and a lithium carbonate group. This compound may be represented by the following Chemical Formula 2.

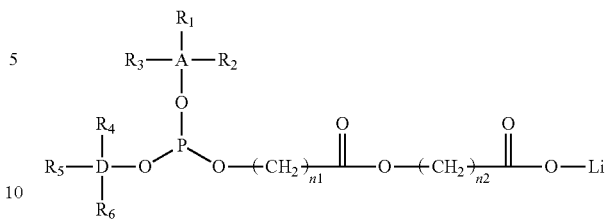

Chemical Formula 2

In the above Chemical Formula 2,

A and D may be the same or different, and may be Si, C, Ge or Sn; $R_1$ to $R_6$ may be the same or different, and may be hydrogen or a substituted or unsubstituted alkyl; n1 is an integer from 1 to 5; and n2 is an integer from 1 to 5.

In an embodiment, a positive active material may be a lithium manganese-based compound, and representative examples thereof may include a compound represented by the following Chemical Formula 5, the following Chemical Formula 6, the following Chemical Formula 7, the following Chemical Formula 8 or a combination thereof.

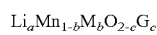

$Li_aMn_{1-b}M_bO_{2-c}G_c$   Chemical Formula 5

$Li_aMn_{2-b}M_bO_{4-c}G_c$   Chemical Formula 6

In the above Chemical Formulae 5 and 6, $0.90 \leq a \leq 1.1$, $0 \leq b \leq 0.5$ and $0 \leq c \leq 0.05$;

M may be Al, Ni, Co, Mn, Cr, Fe, Mg, Sr, a rare earth element or a combination thereof, and G may be O, F, S, P or a combination thereof.

$Li_xMO_{2-z}L_z$   Chemical Formula 7

In the above Chemical Formula 7, M is $M'_{1-k}A_k$, where A is a dopant such as B, Ca, Zr, S, F, P, Bi, Al, Mg, Zn, Sr, Cu, Fe, Ga, In, Cr, Ge or Sn, $0 \leq k < 0.05$, and M' is $Ni_{1-d-e}Mn_dCo_e$, where $0.65 \leq d+e \leq 0.85$, $0.1 \leq e \leq 0.4$;

L may be F, S, P or a combination thereof;

$0.95 \leq x \leq 1.05$; and $0 \leq z \leq 2$.

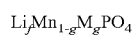

$Li_fMn_{1-g}M_gPO_4$   Chemical Formula 8

In the above Chemical Formula 8, $0.90 \leq f \leq 1.8$; $0 \leq g \leq 0.5$; and M may be Al, Ni, Co, Mn, Cr, Fe, Mg, Sr, a rare earth element or a combination thereof.

The weight fraction of the positive active material may be 90 to 98 weight percent ("wt %") based on the total weight of the positive active material layer.

The positive active material layer may include a binder and a conductive material together with the positive active material. The weight fraction of each of the binder and the conductive material may be 1 to 5 wt % based on the total weight of the positive active material layer.

The binder may improve the binding properties of particles of the positive active material with one another and with a current collector. Examples of the binder include but are not limited to polyvinylalcohol, carboxylmethylcellulose, hydroxypropylcellulose, diacetylcellulose, polyvinylchloride, carboxylated polyvinylchloride, polyvinylchloride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon and the like.

The conductive material may improve electrode conductivity. Any electrically conductive material may be used as the conductive material unless it causes a chemical change in itself or in any of the other compounds included in the rechargeable lithium battery. Examples of the conductive material include but are not limited to natural graphite, artificial graphite, carbon black, acetylene black, ketjenblack, carbon fiber, a metal powder or a metal fiber including copper, nickel, aluminum, silver and the like, a polyphenylene derivative and mixtures thereof.

The current collector may be made of Al, but is not limited thereto.

In an embodiment, a positive electrode includes a positive active material layer. The positive active material layer may be fabricated by a method including mixing into a slurry a positive active material, a binder, a conductive material and an organic solvent; and coating a current collector with the slurry. The slurry is dried on the current collector, thus forming the positive active material layer on the current collector. The solvent may be N-methylpyrrolidone, but is not limited thereto.

In an embodiment, a negative electrode includes a current collector and a negative active material layer disposed thereon. The negative active material layer includes a negative active material. In addition, an additive may be electrically reduced during a formation charge and discharge to form an SEI layer on a surface of the negative active material layer. The SEI layer may be formed in an appropriate thickness, depending on the formation charge and discharge condition, which may be suitably adjusted.

The negative active material includes a material that may reversibly intercalate and deintercalate lithium ions, a lithium metal, a lithium metal alloy, a material being capable of doping lithium or a transition metal oxide.

The material that reversibly intercalates and deintercalates lithium ions may include a carbon material. The carbon material may be any carbon-based negative active material that is suitable for use in a lithium rechargeable battery. Examples of the carbon material include, but are not limited to, crystalline carbon, amorphous carbon and mixtures thereof. The crystalline carbon may be non-shaped, or sheet, flake, spherical or fiber shaped natural graphite or artificial graphite. The amorphous carbon may be soft carbon (carbon obtained by sintering at a low temperature), hard carbon (carbon obtained by sintering at a high temperature), mesophase pitch carbide, fired coke or the like.

Examples of the lithium metal alloy include, but are not limited to, an alloy of lithium and a metal selected from Na, K, Rb, Cs, Fr, Be, Mg, Ca, Sr, Si, Sb, Pb, In, Zn, Ba, Ra, Ge, Al and/or Sn.

Examples of the material being capable of doping lithium include Si; $SiO_x$, where $0<x<2$; an Si-Q alloy, where Q is not Si and is an element selected from the group consisting of an alkali metal, an alkaline-earth metal, a group 13 element, a group 14 element, a transition element, a rare earth element and combinations thereof; Sn; $SnO_2$, an Sn—R alloy, where R is not Sn and is an element selected from the group consisting of an alkali metal, an alkaline-earth metal, a group 13 element, a group 14 element, a transition element, a rare earth element and combinations thereof; and mixtures thereof. At least one of these materials may be mixed with $SiO_2$. The elements Q and R may be the same or different and either may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po or a combination thereof.

Examples of the transition metal oxide include vanadium oxide, lithium vanadium oxide and the like.

The negative active material layer includes 95 to 99 wt % of the negative active material based on the total weight of the negative active material layer.

The negative active material layer may include a binder and optionally may include a conductive material. The negative active material layer may include 1 to 5 wt % of a binder based on the total weight of the negative active material layer. When the conductive material is included, the negative active material layer may include 90 to 98 wt % of a negative active material, 1 to 5 wt % of a binder and 1 to 5 wt % of a conductive material based on the total weight of the negative active material layer.

The binder may improve the binding properties of particles of the negative active material to each other and to a current collector. The binder may include a water-insoluble binder, a water-soluble binder or a combination thereof.

The water-insoluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene or a combination thereof.

The water-soluble binder may include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester or a combination thereof. The (meth)acrylic acid refers to acrylic acid or methacrylic acid, and (meth)acrylic acid alkyl ester refers to acrylic acid alkyl ester or methacrylic acid alkyl ester.

When the binder in the negative active material layer includes a water-soluble binder, it may further include a cellulose-based compound for increasing the viscosity. The cellulose-based compound may include a mixture of carboxylmethyl cellulose, hydroxypropylmethyl cellulose, methyl cellulose, an alkali metal salt thereof or the like. The alkali metal salt may include Na, K and/or Li. The thickener may be added in 0.1 to 3 parts by weight based on 100 parts by weight of the binder.

The conductive material may improve electrode conductivity. Any electrically conductive material may be used as a conductive material unless it causes a chemical change in itself or in any of the other compounds included in the rechargeable lithium battery. Examples of the conductive material include but are not limited to carbon-based materials such as natural graphite, artificial graphite, carbon black, acetylene black, ketjenblack, carbon fiber and the like; metal-based materials including a metal powder or a metal fiber of copper, nickel, aluminum, silver or the like; conductive polymers of a polyphenylene derivative; and mixtures thereof.

The current collector may be a copper foil, a nickel foil, a stainless steel foil, a titanium foil, a nickel foam, a copper foam, a polymer substrate coated with a conductive metal or a combination thereof.

The negative electrode may be fabricated by a method including mixing the negative active material, a conductive material, a solvent and a binder to form an active material composition; and coating a current collector with the active material composition. The solvent may be an organic solvent such as N-methylpyrrolidone when a non-water-soluble binder is used, and the solvent may be water when a water-soluble binder is used, but is not limited thereto.

The electrolyte according to one embodiment includes a non-aqueous organic solvent and a lithium salt along with the above additive.

The non-aqueous organic solvent may function as a medium for transmitting ions that take part in the electrochemical reaction of a battery.

The non-aqueous organic solvent may include a carbonate-based solvent. The non-aqueous organic solvent may further include an ester-based solvent, an ether-based solvent, a ketone-based solvent, an alcohol-based solvent, an aprotic solvent or a combination thereof.

Examples of the carbonate-based solvent may include dimethyl carbonate ("DMC"), diethyl carbonate ("DEC"), dipropyl carbonate ("DPC"), methylpropyl carbonate ("MPC"), ethylpropyl carbonate ("EPC"), methylethyl carbonate ("MEC"), ethylene carbonate ("EC"), propylene carbonate ("PC"), butylene carbonate ("BC") and the like.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone and the like.

Examples of the ether-based solvent include dibutyl ether, tetraglyme, diglyme, dimethoxyethane, 2-methyltetrahydrofuran, tetrahydrofuran and the like.

Examples of the ketone-based solvent include cyclohexanone and examples of the alcohol-based solvent include ethyl alcohol, isopropyl alcohol and the like.

Examples of the aprotic solvent include nitriles such as R—CN, wherein R is a C2 to C20 linear, branched, or cyclic hydrocarbon, an aromatic ring or an ether bond; amides such as dimethylformamide; dioxolanes such as 1,3-dioxolane; sulfolanes; and the like.

The non-aqueous organic solvent may be used singularly or in a mixture. When the organic solvent is used in a mixture, the mixture ratio may be adjusted in accordance with a desired battery performance.

The carbonate-based solvent may include a mixture of a cyclic carbonate and a linear carbonate. The cyclic carbonate and the linear carbonate are mixed together in a volume ratio of about 1:1 to about 1:9, such that when the mixture is used in an electrolyte, the electrolyte performance may be enhanced.

In addition, the electrolyte of one embodiment may further include mixtures of carbonate-based solvents and aromatic hydrocarbon-based solvents. In one embodiment, the carbonate-based solvents and the aromatic hydrocarbon-based solvents are mixed together in a volume ratio of about 1:1 to about 30:1.

The aromatic hydrocarbon-based organic solvent may be represented by the following Chemical Formula 7.

Chemical Formula 7

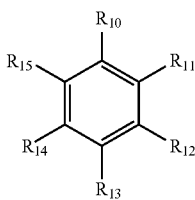

In the above Chemical Formula 7, $R_{10}$ to $R_{15}$ may be the same or different, and each may be hydrogen, a halogen, a C1 to C10 alkyl, a C1 to C10 haloalkyl or a combination thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene or a combination thereof.

The non-aqueous electrolyte may further include vinylene carbonate to improve a cycle life of a battery. The amount of the vinylene carbonate added to the non-aqueous electrolyte may be adjusted to provide improvement of the cycle life of the battery.

In an embodiment, a lithium salt may supply lithium ions in a rechargeable lithium battery, facilitate a basic operation of the rechargeable lithium battery and improve lithium ion transport between positive and negative electrodes. Non-limiting examples of the lithium salt include $LiPF_6$; $LiBF_4$; $LiSbF_6$; $LiAsF_6$; $LiN(SO_2C_2F_5)_2$; $Li(CF_3SO_2)_2N$; $LiN(SO_3C_2F_5)_2$; $LiC_4F_9SO_3$; $LiClO_4$; $LiAlO_2$; $LiAlCl_4$; $LiN(C_xF_{2x+1}SO_2)(C_yF_{2y+1}SO_2)$, where x and y are natural numbers; LiCl; LiI and $LiB(C_2O_4)_2$, also called lithium bisoxalate borate ("LiBOB").

The concentration of the lithium salt may be 0.1 to 2.0M. When the concentration of the lithium salt is within the stated concentration range, the electrolyte may have a certain conductivity and viscosity. This may result in enhanced performance of the electrolyte and lithium ion mobility.

In an embodiment, a rechargeable lithium battery may further include a separator between a negative electrode and a positive electrode, as needed. Non-limiting examples of suitable separator materials include polyethylene, polypropylene, polyvinylidene fluoride and multi-layers thereof such as a polyethylene/polypropylene double-layered separator, a polyethylene/polypropylene/polyethylene triple-layered separator and a polypropylene/polyethylene/polypropylene triple-layered separator.

Rechargeable lithium batteries may be classified as lithium ion batteries, lithium ion polymer batteries or lithium polymer batteries according to the kind of electrolyte used in the battery and the presence of a separator. Here, suitable structures and fabricating methods are utilized for the rechargeable lithium batteries pertaining to this disclosure.

FIG. 1 is a schematic view of a representative structure of a rechargeable lithium battery according to one embodiment. As shown in FIG. 1, a prismatic rechargeable lithium battery 1 includes a battery case 5. The battery case 5 encloses a negative electrode 2, a positive electrode 3 and a separator 4 interposed between the negative electrode 2 and positive electrode 3. An electrolyte impregnates the separator 4. A sealing member 6 seals the battery case 5.

The following examples illustrate embodiments of the present invention in more detail. These examples, however, do not limit the scope of the present invention.

Example 1

A mixed solvent including a cyclic carbonate of ethylene carbonate and a linear carbonate of ethylmethyl carbonate at a ratio of 30:70 volume percent ("volume %") was uniformly mixed. $LiPF_6$ was added to the mixed solvent to a concentration of 1.0M (molar) to form an electrolyte precursor. To the electrolyte precursor, fluoroethylene carbonate ("FEC"), $LiBF_4$ and tris(trimethylsilyl) phosphite (P—(O—Si—$(CH_3)_3)_3$) ("TMSPi") were added to form an electrolyte. The amounts of FEC, LiBF$_4$ and TMSPi added were 5 wt %, 0.4 wt % and 3 wt % based on the total weight of the electrolyte precursor, respectively.

90 wt % of a positive active material of LiMn$_2$O$_4$, 5 wt % of a conductive material of carbon black and 5 wt % of a binder of polyvinylidene fluoride were mixed in N-methylpyrrolidone to form a positive active material slurry. The slurry was coated on a current collector of aluminum foil. This was dried and pressed to form at positive active material layer on the current collector to form a positive electrode.

A coin-type half-cell (2016 cell) was fabricated using the positive electrode, a lithium metal counter electrode and the electrolyte. The half-cell had a discharge capacity of 105 mAh/g.

Example 2

97.5 wt % of a negative active material of natural graphite, 1.5 wt % of a binder of styrene-butadiene rubber and 1 wt % of a thickener of carboxyl methylcellulose were mixed in a water solvent to form a negative active material slurry. The slurry was coated on a current collector of copper foil. This was dried and pressed to form a negative active material layer on the current collector to form a negative electrode.

A pouch type coin full cell (2032 cell) was fabricated using the positive electrode obtained from Example 1 and the electrolyte obtained from Example 1 together with the negative electrode. The obtained battery was formation charged and discharged using a 0.1 C charge and a 0.1 C discharge to form a protective layer on the positive electrode of a rechargeable lithium battery. The weight of the protective layer was 3.3 parts by weight based on 100 parts by weight of the positive active material layer.

Example 3

A coin type half-cell (2016 cell) was fabricated using the negative electrode obtained from Example 2, a lithium metal counter electrode and the electrolyte obtained from Example 1.

Example 4

A coin type half-cell (2016 cell) was fabricated in accordance with the same procedure as in Example 1, except that the positive active material was Li$_{1.1}$Mn$_{1.86}$Mg$_{0.03}$O$_4$.

Example 5

A pouch type coin full cell (2032 cell) was fabricated in accordance with the same procedure as in Example 2, except that the positive active material was Li$_{1.1}$Mn$_{1.86}$Mg$_{0.03}$O$_4$. The obtained battery was formation charged and discharged using a 0.1 C charge and a 0.1 C discharge to form a protective layer on the positive electrode of a rechargeable lithium battery. The weight of the protective layer was 3.3 parts by weight based on 100 parts by weight of the positive active material layer.

Comparative Example 1

A mixed solvent including a cyclic carbonate of ethylene carbonate and a linear carbonate of ethylmethyl carbonate in a ratio of 30:70 volume % was uniformly mixed. LiPF$_6$ was added to the mixed solvent to a concentration of 1.0M to form an electrolyte precursor. FEC and LiBF$_4$ were added to the electrolyte precursor to form an electrolyte. The amounts of FEC and LiBF$_4$ added were 5 wt % and 0.4 wt % based on the total weight of the electrolyte precursor, respectively.

A coin-type half-cell (2016 cell) was fabricated using the electrolyte, the positive electrode obtained from Example 1 and a lithium metal counter electrode.

Comparative Example 2

97.5 wt % of a negative active material of natural graphite, 1.5 wt % of a binder of styrene-butadiene rubber and 1 wt % of a thickener of carboxyl methylcellulose were mixed in a water solvent to form a negative active material slurry. The slurry was coated on a copper foil current collector. This was dried and pressed to form negative active material layer on a current collector to form a negative electrode.

90 wt % of a positive active material of LiCoO$_2$, 5 wt % of a conductive material of carbon black and 5 wt % of a binder of polyvinylidene fluoride were mixed in N-methylpyrrolidone to form a positive active material slurry. The slurry was coated on an aluminum foil current collector. This was dried and pressed to form positive active material layer on a current collector to form a positive electrode.

A pouch type coin full cell (2032 cell) was fabricated using the negative electrode, the positive electrode, and the electrolyte obtained from Comparative Example 1. The obtained battery was formation charged and discharged using a 0.1 C charge and a 0.1 C discharge.

Comparative Example 3

A mixed solvent including a cyclic carbonate of ethylene carbonate and a linear carbonate of ethylmethyl carbonate in a ratio of 30:70 volume % was uniformly mixed. LiPF$_6$ was added to the mixed solvent to a concentration of 1.0M to form an electrolyte.

A coin-type half-cell (2016 cell) was fabricated using the electrolyte, the positive electrode obtained from Example 1 and a lithium metal counter electrode.

Comparative Example 4

A coin-type half-cell (2016 cell) was fabricated in accordance with the same procedure as in Example 1, except that tris(trifluoroethyl)phosphite (P—(O—Si—(CH$_2$CF$_3$)$_3$)$_3$) ("TFEPi") was used instead of TMSPi.

Comparative Example 5

A coin-type half-cell (2016 cell) was fabricated in accordance with the same procedure as in Example 1, except that tris(trimethyl silyl)borate(B—(O—Si—CH$_3$)$_3$)$_3$) ("TMSB") was used instead of TMSPi.

Comparative Example 6

A mixed solvent including a cyclic carbonate of ethylene carbonate and a linear carbonate of ethylmethyl carbonate in a ratio of 30:70 volume % was uniformly mixed. LiPF$_6$ was added to the mixed solvent to a concentration of 1.0M to form an electrolyte precursor. FEC, LiBF$_4$ and LiB(C$_2$O$_4$)$_2$ (lithium bis(oxalato)borate) ("LiBOB") were added to the electrolyte precursor to form an electrolyte. The amounts of FEC, LiBF$_4$ and LiB(C$_2$O$_4$)$_2$ added were 5 wt %, 0.4 wt % and 0.5 wt % based on the total amount of the electrolyte precursor, respectively.

A coin-type half-cell (2016 cell) was fabricated using the electrolyte, the positive electrode obtained from Example 1 and a lithium metal counter electrode.

Comparative Example 7

A mixed solvent including a cyclic carbonate of ethylene carbonate and a linear carbonate of ethylmethyl carbonate in a ratio of 30:70 volume % was uniformly mixed. $LiPF_6$ was added to the mixed solvent to a concentration of 1.0M to form an electrolyte precursor. TMSPi was added to the electrolyte precursor to form an electrolyte. The amount of TMSPi added was 3 wt % based on the total weight of the electrolyte precursor. A coin-type half-cell (2016 cell) was fabricated using the electrolyte, the positive electrode obtained from Example 1 and a lithium metal counter electrode.

Comparative Example 8

A coin-type half-cell (2016 cell) was fabricated in accordance with the same procedure as in Comparative Example 7, except that the amount of TMSPi added was 12 wt % based on the total weight of the electrolyte precursor.

Comparative Example 9

A coin-type half-cell (2016 cell) was fabricated in accordance with the same procedure as in Example 1, except that trimethyl octyl silane $(CH_3(CH_2)_7—Si—(OCH_3)_3)$ was used instead of TMSPi.

Comparative Example 10

A coin-type half-cell (2016 cell) was fabricated using the negative electrode obtained from Example 2, a lithium metal counter electrode and the electrolyte obtained from Comparative Example 1.

Comparative Example 11

A coin-type half-cell (2016 cell) was fabricated in accordance with the same procedure as in Comparative Example 1, except that $Li_{1.1}Mn_{1.86}Mg_{0.03}O_4$ was used for the positive active material.

Comparative Example 12

A coin-type half-cell (2016 cell) was fabricated in accordance with the same procedure as in Comparative Example 2, except that $Li_{1.1}Mn_{1.86}Mg_{0.03}O_4$ was used for the positive active material.

Comparative Example 13

A coin-type half-cell (2016 cell) was fabricated in accordance with the same procedure as in Comparative Example 3, except that $Li_{1.1}Mn_{1.86}Mg_{0.03}O_4$ was used for the positive active material.

Comparative Example 14

A mixed solvent including a cyclic carbonate of ethylene carbonate and a linear carbonate of ethylmethyl carbonate in a ratio of 30:70 volume % was uniformly mixed. $LiPF_6$ was added to the mixed solvent to a concentration of 1.0M to form an electrolyte precursor. TMSPi was added to the electrolyte precursor to provide an electrolyte. The amount of TMSPi added was 3 wt % based on the total weight of electrolyte precursor.

A pouch type coin full cell (2032 cell) was fabricated in accordance with the same procedure as in Comparative Example 2, using the electrolyte, the positive electrode obtained from Example 1 and the negative electrode obtained from Example 2.

The half cells obtained from Example 1 and Comparative Examples 1, and 3 to 6 and the full cells obtained from Example 2 and Comparative Example 2 were charged to 4.2V and stored in an oven at 60° C. for 10 days. The half-cells and the full cells were then discharged to 2.75V to measure the retained capacity after the high temperature storage. The capacity retention was determined by calculating the ratio of the retained capacity after the high temperature storage to the capacity before the storage at 60° C. The results are shown in the following Table 1. The specific capacity was determined by dividing the capacity by the weight of the positive active material.

TABLE 1

| | Half-cell | | | | | | Full cell | |
| --- | --- | --- | --- | --- | --- | --- | --- | --- |
| | Example 1 | Comparative Example 1 | Comparative Example 3 | Comparative Example 4 | Comparative Example 5 | Comparative Example 6 | Example 2 | Comparative Example 2 |
| Specific capacity (mAh/g) | 96 | 89 | 86 | 37 | 13 | 89 | 87.3 | 76.3 |
| Capacity retention (%) | 92 | 84 | 82 | 35 | 12 | 84 | 83.1 | 72.7 |

As shown in Table 1, the half cell obtained from Example 1 and the full cell obtained from Example 2 had both superior specific capacity and superior capacity retention compared to those of Comparative Examples 1 to 6. Particularly, in the cases of Comparative Example 4 using TFEPi and Comparative Example 5 using TMSB, the specific capacity and the capacity retention were greatly decreased after storage at 60° C.

Two of each of the half cells obtained from Example 1 and Comparative Examples 1, 7 and 8 were formation charged and discharged using a 0.1 C charge and a 0.1 C discharge. The charge capacity and the discharge capacity are shown in the following Table 2. In addition, the initial coulombic efficiency ("ICE"), also called formation efficiency, was measured. The results are shown in the following Table 2.

TABLE 2

|  | Formation charge capacity (mAh/g) | Formation discharge capacity (mAh/g) | ICE (%) |
|---|---|---|---|
| Comparative Example 7 | 111.9 | 102.5 | 91.6 |
|  | 111.2 | 102.1 | 91.8 |
| Comparative Example 8 | 121.3 | 102.6 | 84.6 |
|  | 120.8 | 101.9 | 84.4 |
| Example 1 | 104.3 | 102.5 | 98.3 |
|  | 104.5 | 102.6 | 98.1 |
| Comparative Example 1 | 104.0 | 103.0 | 99.0 |
|  | 104.3 | 103.3 | 99.0 |

As shown in Table 2, it is understood that the initial coulombic efficiency was remarkably low in the case of Comparative Example 7 and 8, both of which did not include FEC. In particular, the initial coulombic efficiency was remarkably low in the case of Comparative Example 8, which included an excessive amount (12 wt %) of TMSPi.

It is also understood that Comparative Example 1, which included FEC and did not include TMSPi, and Example 1, which included both FEC and TMSPi, both showed a similarly high initial coulombic efficiency. Example 1 showed a slightly lower initial coulombic efficiency than Comparative Example 1. It is hypothesized that lithium is partially consumed during the formation of the protective layer on the surface of the positive electrode, so less Li is available during subsequent charge and discharge.

The full cells obtained from Example 2 and Comparative Example 14 were formation charged and discharged using a 0.1 C charge and a 0.1 C discharge. The charge capacity and discharge capacity are shown in the following Table 3. The initial coulombic efficiency was measured and the results are shown in the following Table 3.

TABLE 3

|  | Formation charge capacity (mAh/g) | Formation discharge capacity (mAh/g) | ICE (%) |
|---|---|---|---|
| Comparative Example 14 | 390 | 347 | 89 |
| Example 2 | 374 | 352 | 94 |

As shown in Table 3, Comparative Example 14, which included an electrolyte with TMSPi but with no FEC, had a slightly higher charge capacity than that of Example 2. However, both the discharge capacity and the initial coulombic efficiency of Comparative Example 14 were remarkably low compared to those of Example 2.

Figure 2:
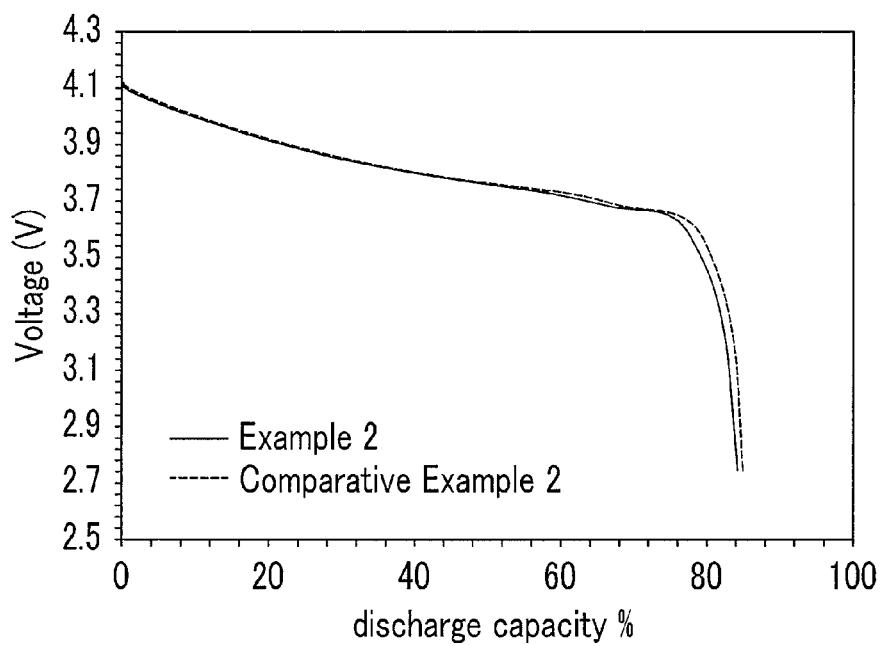
FIG. 2 is a graph showing a discharge capacity of full cells obtained from Example 2 and Comparative Example 2 after storage at 60° C. for 10 days.

The full cells obtained from Example 2 and Comparative Example 2 were stored at 60° C. for 10 days. The discharge capacity was measured after the 10 days and the results are shown in FIG. 2. As shown in FIG. 2, Example 2, which included both TMSPi and FEC, showed a similar discharge capacity to Comparative Example 2, which included $LiCoO_2$ as a positive active material. A positive active material including $LiMn_2O_4$ has a lower capacity than a positive active material including $LiCoO_2$. Although Example 2 included $LiMn_2O_4$ as a positive active material, it maintained a similar capacity level as that of Comparative Example 2, which included $LiCoO_2$ as a positive active material. This was accomplished by adding both TMSPi and FEC to the electrolyte in Example 2, thus forming the appropriate protective layers on both the positive electrode and the negative electrode.

Figure 3:
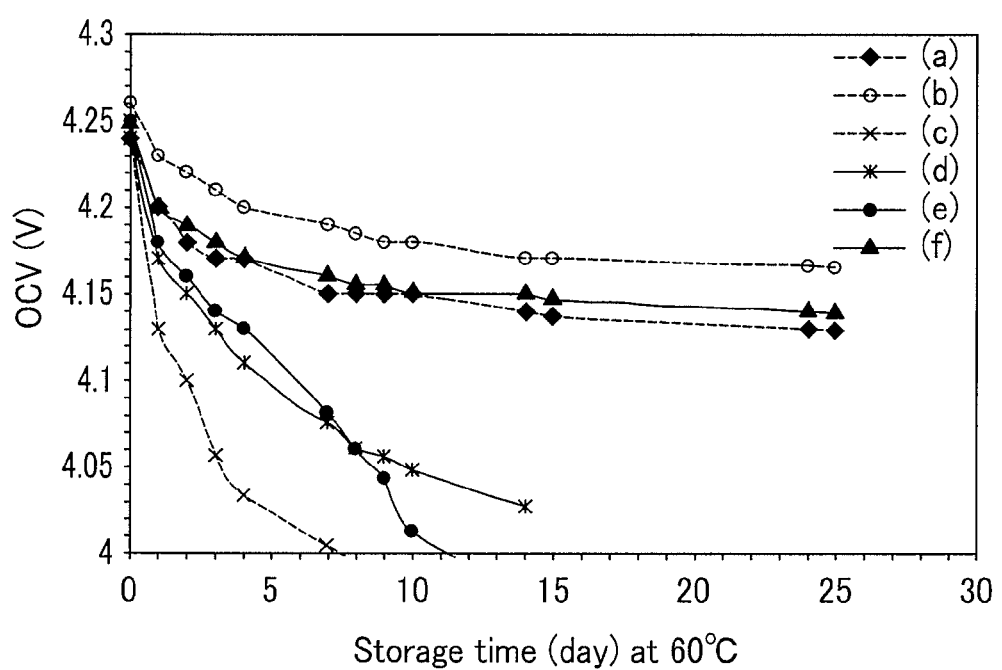
FIG. 3 is a graph showing an open circuit voltage ("OCV") change of half cells obtained from Example 1 and Comparative Examples 1, 3, 4, 5 and 9 during storage at 60° C. for 25 days.

The half cells obtained from Example 1 and Comparative Examples 1, 3, 4, 5 and 9 were stored at 60° C. for 25 days, during which time the open circuit voltage ("OCV") change was monitored. In other words, the cells stored for 0 days, 1 day, 2 days, 3 days, 4 days, 7 days, 8 days, 9 days, 10 days, 14 days, 15 days, 24 days and 25 days, were each charged to 4.3V on day 0 and then the OCV of each cell was measured on the indicated day. The results are shown in FIG. 3, where series a designates Comparative Example 3, series b designates Example 1, series c designates Comparative Example 5, series d designates Comparative Example 9, series e designates Comparative Example 4 and series f designates Comparative Example 1. A decrease in OCV indicates an elution of Mn ions and a decrease in the positive electrode resistance. As shown in FIG. 3, Example 1, shown as series b, had just a small decrease in OCV, even after being stored at 60° C. for 25 days. On the other hand, Comparative Examples 4, 5 and 9, shown respectively as series e, c and d, each exhibit a great decrease in OCV, even after being stored at 60° C. for just a few days. In the case of Comparative Example 1, shown as series f, which includes FEC and does not include TMSPi, the OCV had a smaller decrease compared to Comparative Example 3, shown as series a. However, the OCV for Comparative Example 1, shown as series f, had a larger decrease compared to that of Example 1, shown as series b.

Figure 4:
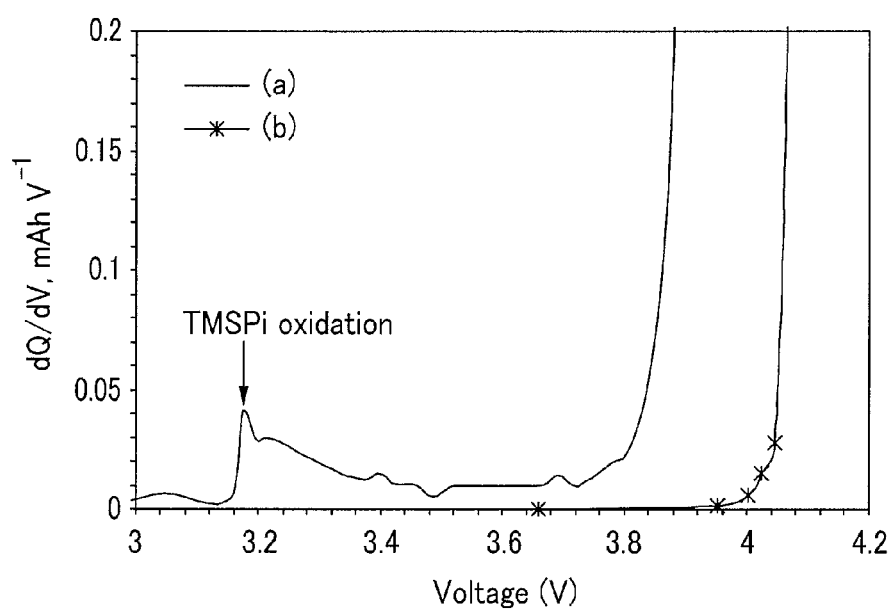
FIG. 4 is a graph showing a differential capacity dQ/dV of half cells obtained from Example 1 and Comparative Example 1 after a single charging at 0.1 C.

The full cells obtained from Example 1 and Comparative Example 1 were charged once with 0.1 C to measure differential capacity dQ/dV. The results are shown in FIG. 4, where series a designates Example 1 and series b designates Comparative Example 1. As shown in FIG. 4, the half cells obtained from Example 1, shown as series a, showed a peak in differential capacity around 3.2V. On the other hand, the half cell obtained from Comparative Example 1 did not show such a peak in differential capacity around 3.2V. The peak in differential capacity around 3.2V is a peak indicating that the TMSPi is oxidized. From the results shown in FIG. 4, it is understood that the protective layer formed on the positive active material layer of Example 1 was obtained from the decomposition product of TMSPi.

Figure 5:
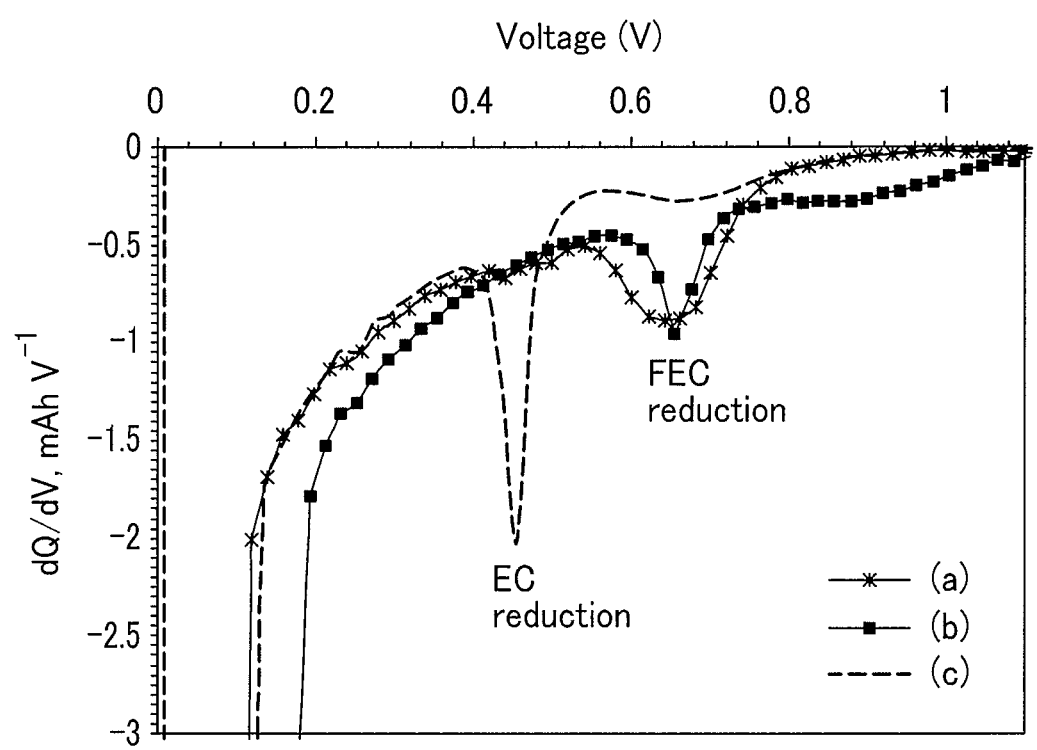
FIG. 5 is a graph showing a differential capacity dQ/dV of half cells obtained from Example 3 and Comparative Examples 3 and 10 after a single charging at 0.1 C.

Half cells obtained from Example 3 and Comparative Examples 3 and 10 were charged once with 0.1 C to measure the differential capacity dQ/dV. The results are shown in FIG. 5, where series a designates Comparative Example 10, series b designates Example 3 and series c designates Comparative Example 3. As shown in FIG. 5, both Example 3, designated as series b and including both TMSPi and FEC, and Comparative Example 10, designated as series a and including FEC but no TMSPi, show an FEC reduction peak near 0.65V. From the results, the SEI layer formed on the negative electrode was not formed from TMSPi, but was formed from FEC. In addition, in the case of Comparative Example 3, designated as series c, which included EC but no FEC, the ethylene carbonate ("EC") reduction peak was shown at 0.43V. Thus, it is hypothesized that EC has a higher LUMO energy than FEC.

The cells obtained from Examples 4 and 5 and Comparative Examples 11 to 14 were charged and discharged at 3.0V and 4.3V and at 0.1 C, then the ICE was measured. The results are shown in the following Table 4.

TABLE 4

|  | ICE (%) |
|---|---|
| Example 4 | 98.6 |
| Comparative Example 11 | 98.8 |
| Comparative Example 13 | 98.6 |
| Example 5 | 91.9 |
| Comparative Example 12 | 91.4 |

As shown in Table 4, the half cells obtained from Example 4 and Comparative Examples 11 and 13 had similar initial coulombic efficiencies. Also, the full cells obtained from Example 5 and Comparative Example 12 had similar initial coulombic efficiencies. Thus, it is understood that the addition of TMSPi did not decrease the capacity.

Figure 6A:
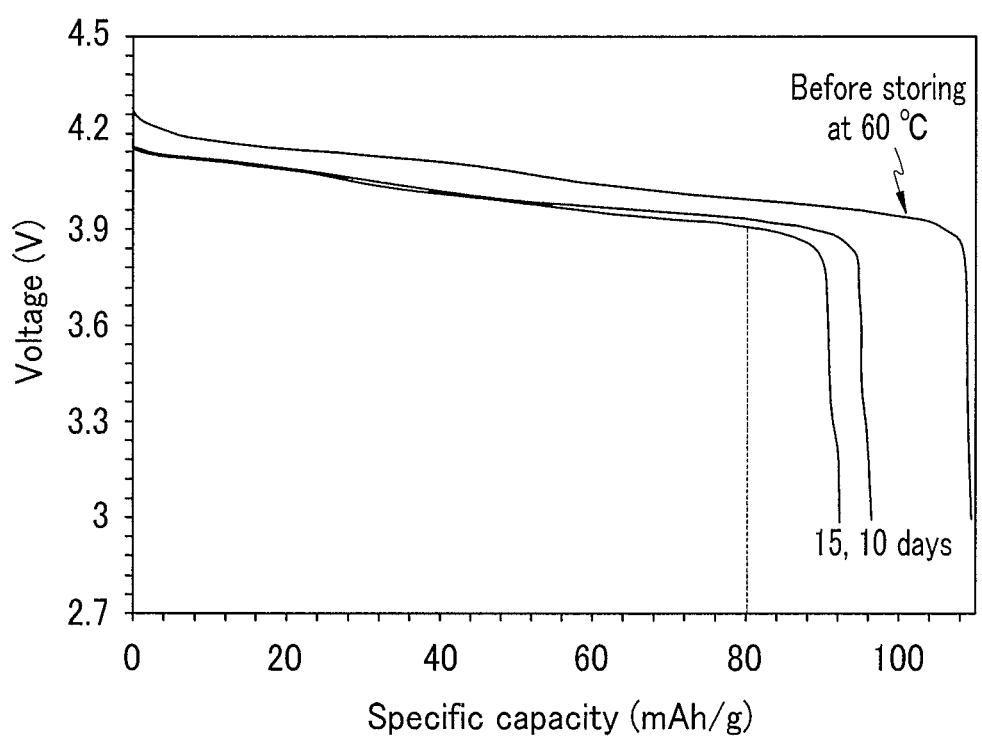
FIG. 6A is a graph showing a discharge capacity of a half cell obtained from Example 1 after storage at 60° C. for 15 days.
Figure 6B:
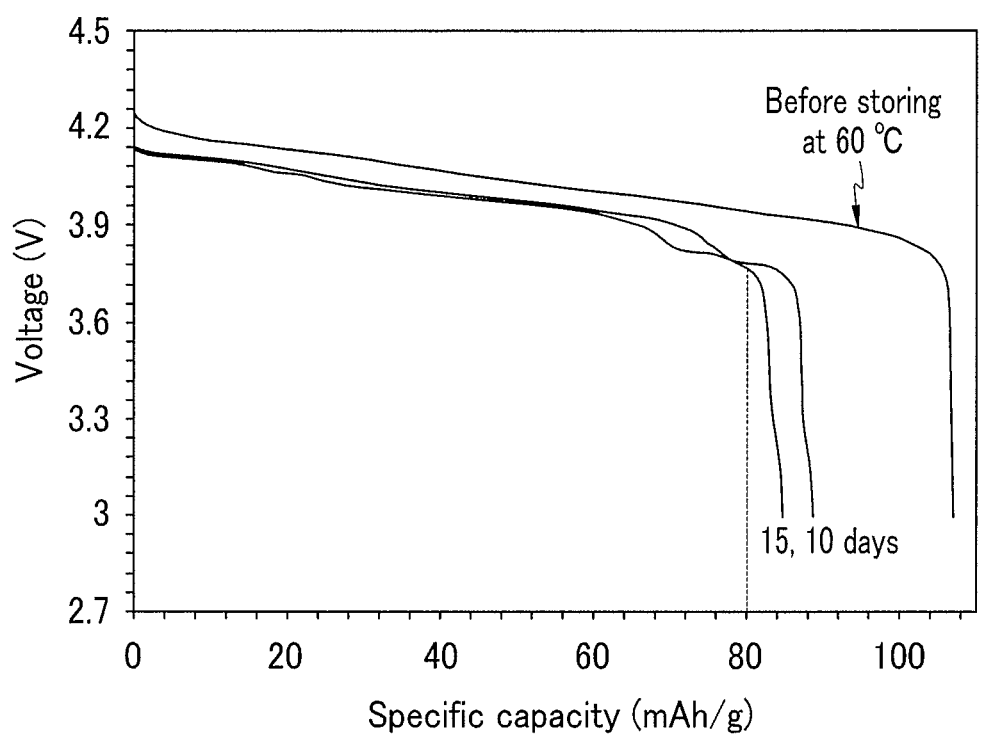
FIG. 6B is a graph showing a discharge capacity of a half cell obtained from Comparative Example 1 after storage at 60° C. for 15 days.

FIG. 6A shows the results of a specific discharge capacity measured on a 10th day and a 15th day after storing the half cells obtained from Example 1 at 60° C. for 15 days. Similarly, FIG. 6B shows the results of a specific discharge capacity measured on a 10th day and a 15th day after storing the half cells obtained from Comparative Example 1 at 60° C. for 15 days. As shown in FIG. 6A, the half cell obtained from Example 1 had the specific capacity of about 92 mAh/g even after it was stored at 60° C. for 15 days. In contrast, as shown in FIG. 6B, the half cell obtained from Comparative Example 2 had the specific capacity of less than 90 mAh/g, even after it was stored at 60° C. for only 10 days. Thus, the specific capacity of Comparative Example 2 deteriorated much faster and to a greater extent than that of Example 1.

Figure 7A:
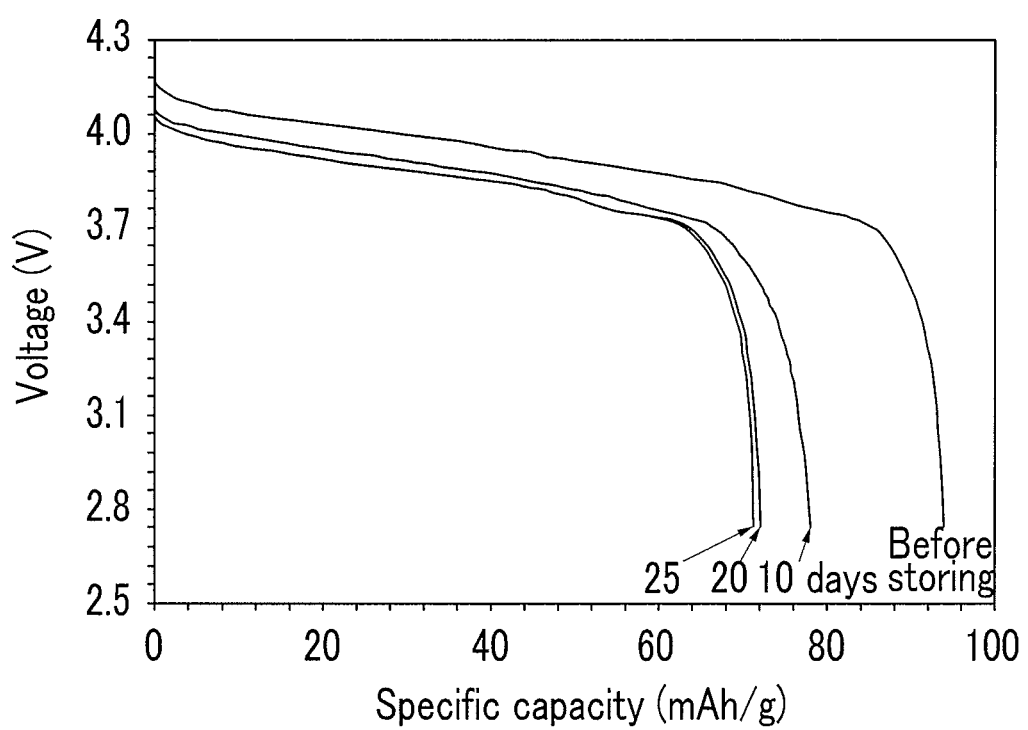
FIG. 7A is a graph showing a discharge capacity measured on a 10th day, a 20th day and a 25th day while storing the full cell obtained from Example 2 at 60° C. for 25 days.
Figure 7B:
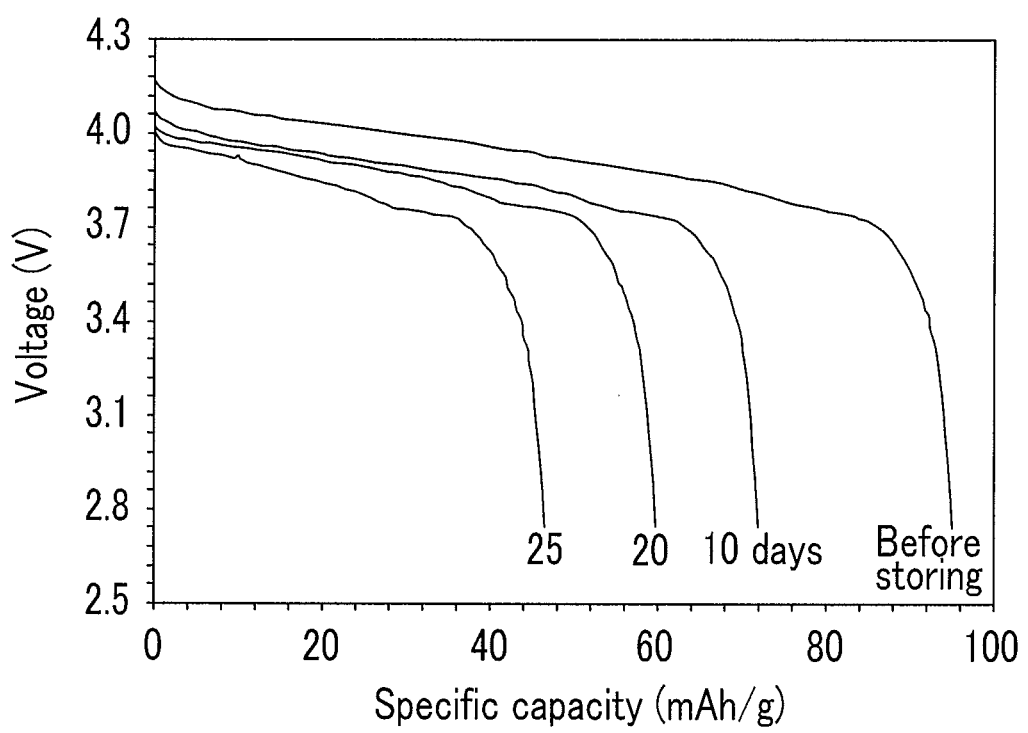
FIG. 7B is a graph showing a discharge capacity measured on a 10th day, a 20th day and a 25th day while storing the full cell obtained from Comparative Example 2 at 60° C. for 25 days.

While the full cells obtained from Example 2 and Comparative Example 2 were stored at 60° C. for 25 days, the discharge capacity was measured on a 10th day, a 20th day and a 25th day. The results from Example 2 and Comparative Example 2 are shown in FIG. 7A and FIG. 7B, respectively. As shown in FIG. 7B, Comparative Example 2, which included FEC and did not include TMSPi, exhibited a remarkable decrease in the high temperature capacity retention, with a specific capacity decreasing from 93.4 mAh/g to 49.5 mAh/g after 25 days. This 49% decrease occurred even though FEC formed an SEI layer on the surface of negative active material of natural graphite. It is hypothesized that the discharge capacity decrease was caused by a reduction reaction of the positive active material due to the elution of Mn ions and a lithium precipitation due to a deposition of Mn ions on the negative electrode.

As shown in FIG. 7A, Example 2 exhibited a capacity retention of 75.2% even after being stored at 60° C. for 25 days. This is far superior to the results from Comparative Example 2 shown in FIG. 7B. It is understood that the favorable results for Example 2 were due to the formation of the protective layer from TMSPi on the positive active material layer, which suppressed elution of Mn ions.

Figure 8A:
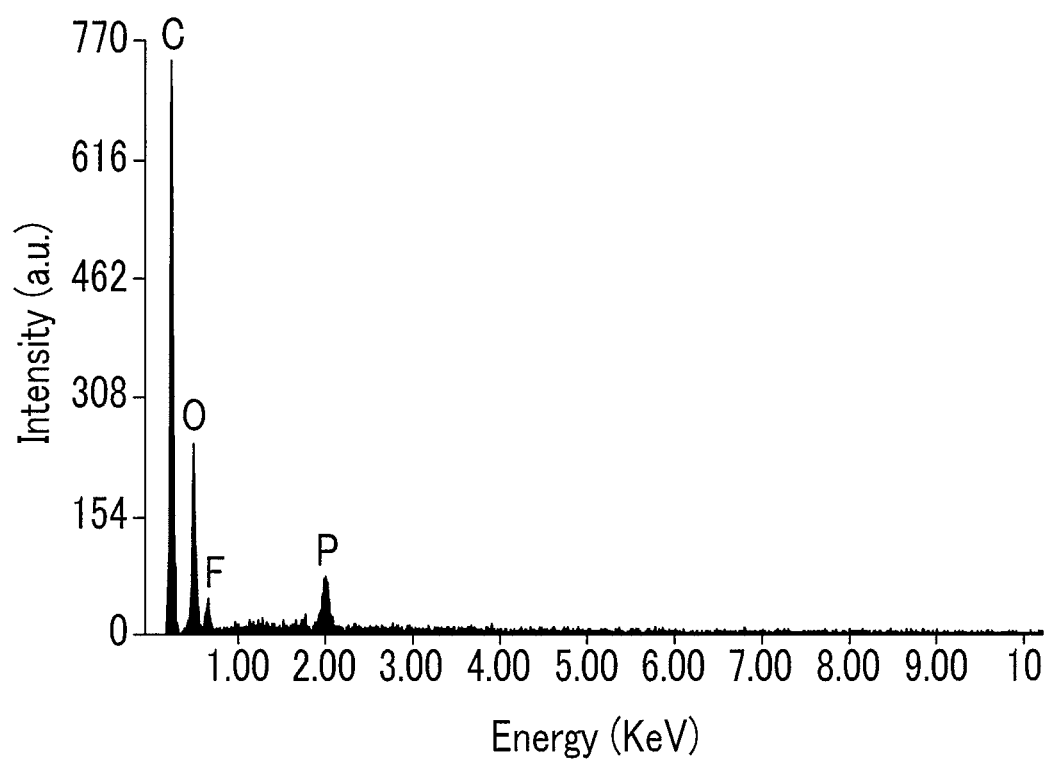
FIG. 8A is a graph showing an energy dispersive x-ray spectroscopy ("EDS") spectrum of a full cell obtained from Example 2 after storage at 60° C.
Figure 8B:
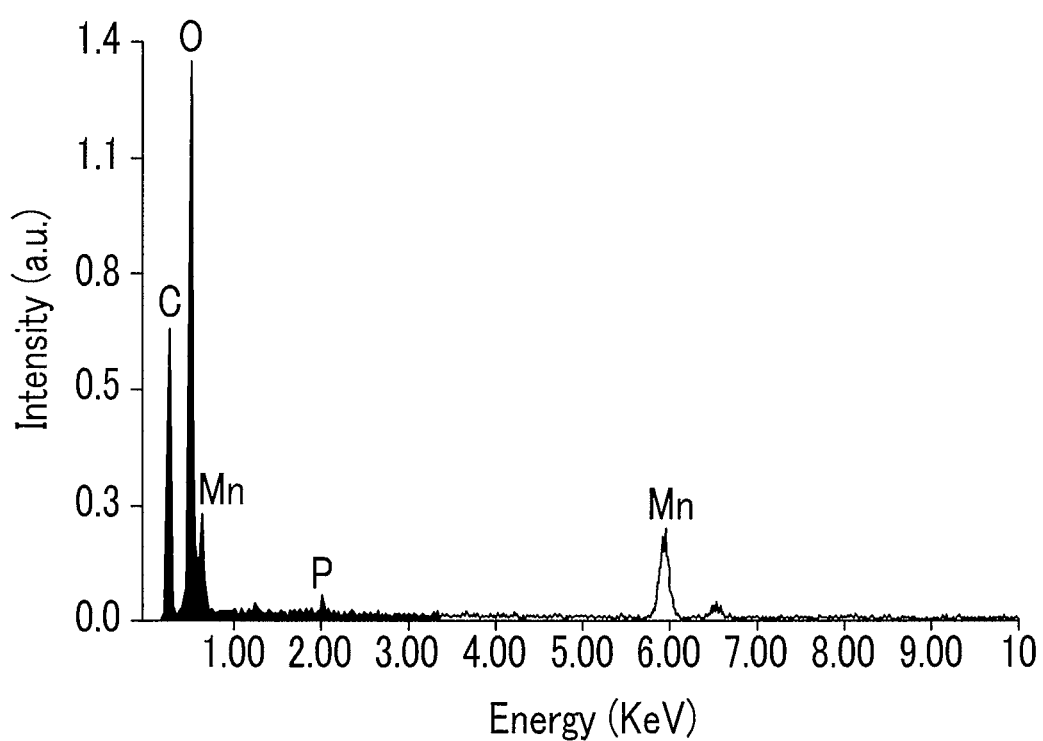
FIG. 8B is a graph showing an EDS spectrum of a full cell obtained from Comparative Example 2 after storage at 60° C.

After storing the full cells obtained from Example 2 and Comparative Example 2 at 60° C., the cells were characterized using energy dispersive x-ray spectroscopy ("EDS"). The results for Example 2 and Comparative Example 2 are shown in FIG. 8A and FIG. 8B, respectively. As shown in FIG. 8B, the full cell obtained from Comparative Example 2 showed an Mn peak. In contrast, as shown in FIG. 8A, the full cell obtained from Example 2 did not show an Mn peak. Accordingly, the protective layer formed from TMSPi on the positive active material layer in Example 2 effectively suppressed the dissolution of Mn from the positive active material into the electrolyte and also suppressed the transport of the dissolved Mn to the negative electrode.

While the present invention has been described in connection with certain exemplary embodiments, its is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery comprising:
a positive electrode comprising a current collector, a positive active material layer on the current collector and comprising a lithium manganese-based positive active material, and a protective layer on the positive active material layer and comprising a decomposition product of a phosphite-based compound; the phosphite-based compound having a Highest Occupied Molecular Orbital ("HOMO") value of −10 eV to −7 eV and a Lowest Occupied Molecular Orbital ("LUMO") value of 1 to 1.3 eV;
a negative electrode; and
an electrolyte comprising a lithium salt, a non-aqueous solvent and an additive, wherein the additive is an ethylene carbonate-based compound represented by the following Chemical Formula 3, an isoxazole compound represented by the following Chemical Formula 4, or a combination thereof,

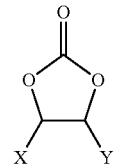

Chemical Formula 3 wherein X and Y are identical or different, and are selected from the group consisting of hydrogen, halogens, cyano (CN), nitro ($NO_2$) and a substituted alkyl, provided that at least one of X or Y is a halogen or a substituted alkyl,

Chemical Formula 4 wherein an amount of the phosphite-based compound is about 0.1 wt % to 10 wt % based on a total weight of the lithium salt and the non-aqueous solvent, and an amount of the additive is 0.1 parts to 5 parts by weight based on a total 100 parts by weight of the lithium salt and the non-aqueous solvent, and wherein the protective layer comprises the decomposition product of the phosphite-based compound represented by Chemical Formula 1,

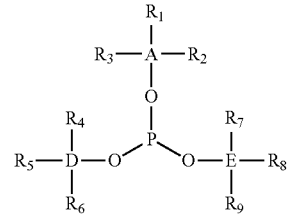

Chemical Formula 1 wherein
A, D, and E are identical or different, and are selected from the group consisting of Si, Ge and Sn; and
$R_1$ to $R_9$ are identical or different, and are selected from the group consisting of hydrogen, a substituted alkyl and an unsubstituted alkyl, and
wherein the weight fraction of the protective layer is about 3 to 35 parts by weight based on 100 parts by weight of the positive active material layer.

2. The rechargeable lithium battery of claim 1, wherein the protective layer comprises the phosphite-based compound represented by the following Chemical Formula 2, Chemical Formula 2

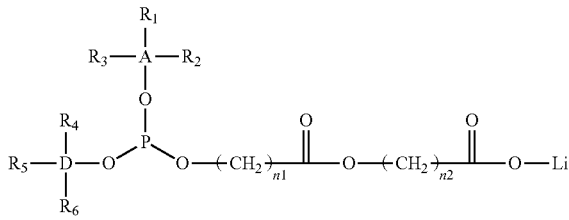

wherein
- A and D are identical or different, and are selected from the group consisting of Si, C, Ge and Sn;
- $R_1$ to $R_6$ are identical or different, and are selected from the group consisting of hydrogen, a substituted alkyl and an unsubstituted alkyl; and
- n1 is an integer from 1 to 5, and n2 is an ranging from 1 to 5.

3. The rechargeable lithium battery of claim 1, wherein the additive has a Highest Occupied Molecular Orbital ("HOMO") value of −12 eV to −11 eV and a Lowest Occupied Molecular Orbital ("LUMO") value of 0.9 eV to 1.2 eV.

4. The rechargeable lithium battery of claim 1, wherein the negative electrode has a solid electrolyte interface ("SEI") layer obtained by electrochemically reducing the additive on a surface of the negative electrode.

5. The rechargeable lithium battery of claim 1, wherein the lithium manganese-based positive active material is a compound represented by the following Chemical Formula 5, Chemical Formula 6, Chemical Formula 7, Chemical Formula 8 or a combination thereof, $$Li_aMn_{1-b}M_bO_{2-c}G_c \quad \text{Chemical Formula 5}$$

$$Li_aMn_{2-b}M_bO_{4-c}G_c \quad \text{Chemical Formula 6}$$

wherein
- $0.90 \leq a \leq 1.1$;
- $0 \leq b \leq 0.5$;
- $0 \leq c \leq 0.05$;
- M is selected from the group consisting of Al, Ni, Co, Mn, Cr, Fe, Mg, Sr, rare earth elements and combinations thereof; and
- G is selected from the group consisting of O, F, S, P and combinations thereof, $$Li_xMO_{2-z}L_z \quad \text{Chemical Formula 7}$$

wherein
- M is $M'_{1-k}A_k$,
  wherein
  - A is a dopant,
  - $0 \leq k \leq 0.05$, and
  - M' is $Ni_{1-d-e}Mn_dCo_e$,
    wherein
    - $0.65 \leq d+e \leq 0.85$, and
    - $0.1 \leq e \leq 0.4$;
- L is selected from the group consisting of F, S, P and combinations thereof;
- $0.95 \leq x \leq 1.05$; and
- $0 \leq z \leq 2$, $$Li_fMn_{1-g}M_gPO_4 \quad \text{Chemical Formula 8}$$

wherein
- $0.90 \leq f \leq 1.8$,
- $0 \leq g \leq 0.5$, and
- M is selected from the group consisting of Al, Ni, Co, Mn, Cr, Fe, Mg, Sr, rare earth elements and combinations thereof.

* * * * *